(12) United States Patent
Spanner

(10) Patent No.: US 7,639,366 B2
(45) Date of Patent: Dec. 29, 2009

(54) POSITION-MEASURING DEVICE FOR DETERMINING THE POSITION OF TWO OBJECTS MOVABLE WITH RESPECT TO EACH OTHER ALONG A MEASURING DIRECTION, AND METHOD FOR FORMING A REFERENCE PULSE FOR SUCH A POSITION-MEASURING DEVICE

(75) Inventor: Erwin Spanner, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 294 days.

(21) Appl. No.: 11/431,182

(22) Filed: May 9, 2006

(65) Prior Publication Data

US 2006/0262315 A1 Nov. 23, 2006

(30) Foreign Application Priority Data

May 17, 2005 (DE) .................. 10 2005 023 489

(51) Int. Cl.
*G01B 9/02* (2006.01)
(52) U.S. Cl. ...................... 356/486; 356/484
(58) Field of Classification Search ............. 356/482, 356/486, 487, 493, 500, 498
See application file for complete search history.

(56) References Cited

U.S. PATENT DOCUMENTS

| 6,157,458 | A | * | 12/2000 | Zorabedian ............... 356/487 |
| 6,369,951 | B1 | * | 4/2002 | Spanner .................... 359/629 |
| 6,535,290 | B1 | | 3/2003 | Spanner et al. |
| 6,934,035 | B2 | * | 8/2005 | Yang et al. ................ 356/485 |
| 2002/0001085 | A1 | * | 1/2002 | Dickopf et al. ............ 356/445 |

(Continued)

FOREIGN PATENT DOCUMENTS

EP 1 068 486 1/2002

(Continued)

*Primary Examiner*—Michael A Lyons
*Assistant Examiner*—Jonathan M Hansen
(74) *Attorney, Agent, or Firm*—Kenyon & Kenyon LLP

(57) ABSTRACT

A position-measuring device for determining the positions of two objects movable with respect to each other along a measuring direction includes a first radiation source for emitting an electromagnetic beam of rays, a beam splitter, which splits each beam of rays emitted by the radiation source into at least one first and one second partial beam of rays, a reference reflector arranged in the beam path of the first partial beam of rays, a measuring reflector, movable with respect to the reference reflector along the measuring direction, which is arranged in the beam path of the second partial beam of rays, a device for superposing the two partial rays of beams after their reflecting at the respective reflector, for generating a measuring signal, a second radiation source for emitting additional electromagnetic beams of rays and a combining device for combining the additional electromagnetic beams of rays into the beam path of the electromagnetic beam of rays generated by the first radiation source. In the position-measuring device, a detection device is arranged such that it receives a reference signal formed by superposition of the beams of rays emitted by the first radiation source and the additional beams of rays, and an evaluation device is assigned to the detection device, which is equipped and provided for evaluating the reference signal formed by the superposition of the beams of rays of the two radiation sources for generating a reference pulse.

47 Claims, 8 Drawing Sheets

U.S. PATENT DOCUMENTS

2002/0140945 A1 * 10/2002 de Groot et al. ............ 356/517

FOREIGN PATENT DOCUMENTS

| | | |
|---|---|---|
| EP | 1 031 868 | 5/2003 |
| JP | 5-149708 | 6/1993 |
| JP | 7-190712 | 7/1995 |
| JP | 11-237209 | 8/1999 |

* cited by examiner

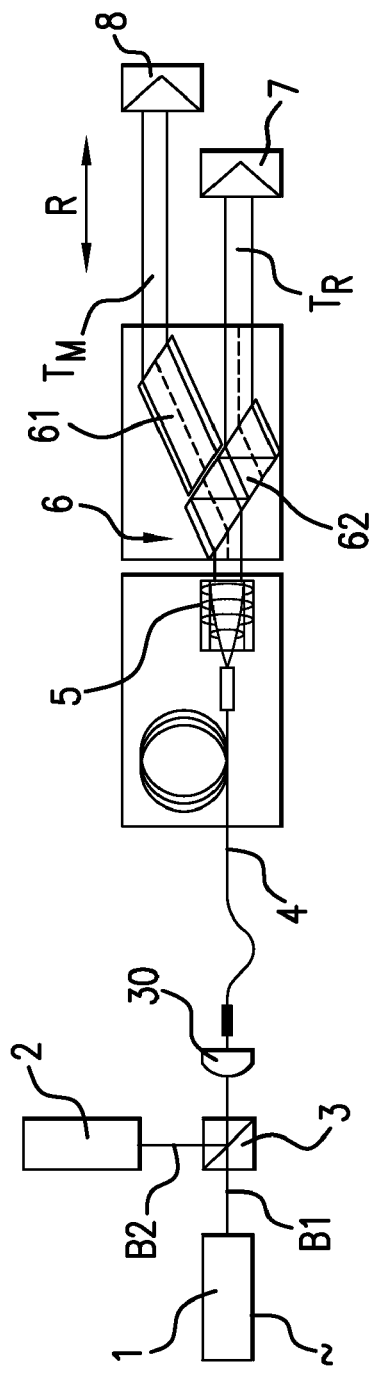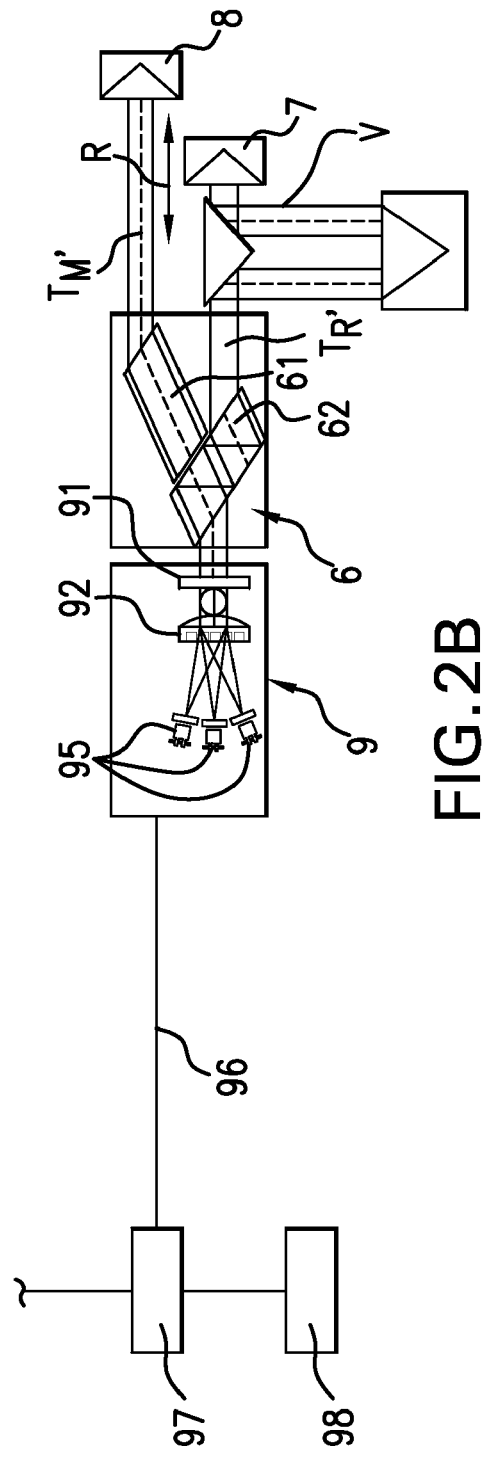
FIG.2A
FIG.2B

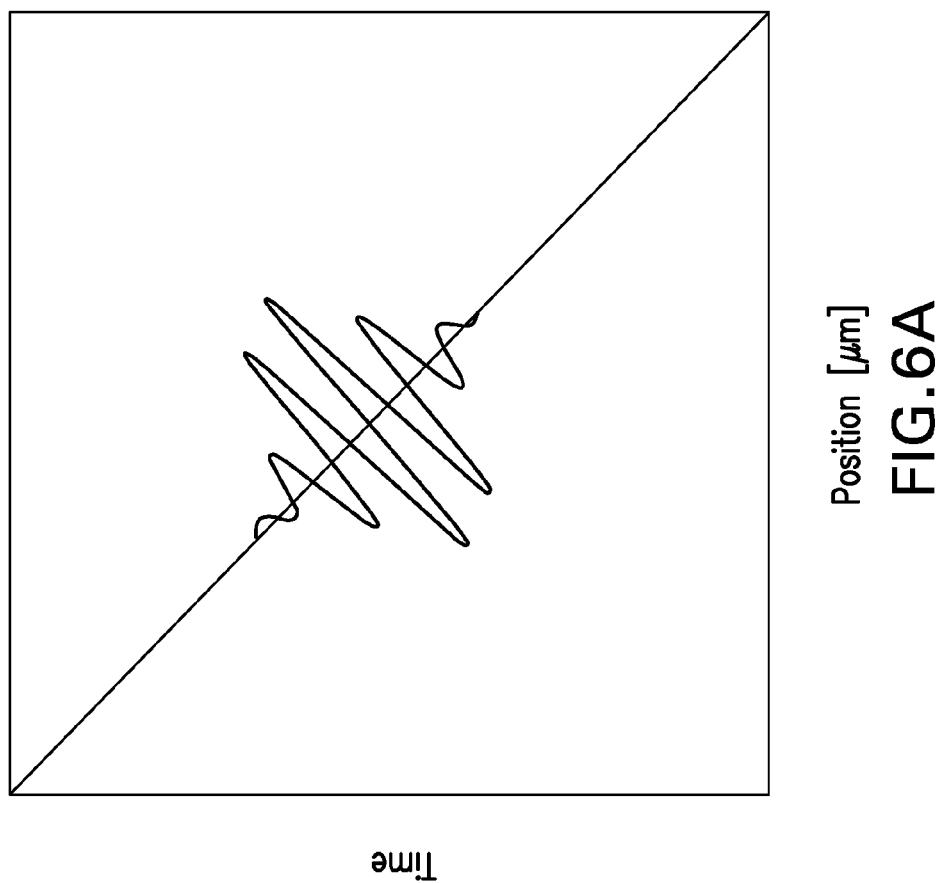

POSITION-MEASURING DEVICE FOR DETERMINING THE POSITION OF TWO OBJECTS MOVABLE WITH RESPECT TO EACH OTHER ALONG A MEASURING DIRECTION, AND METHOD FOR FORMING A REFERENCE PULSE FOR SUCH A POSITION-MEASURING DEVICE

CROSS-REFERENCE TO RELATED APPLICATIONS

The present application claims priority to Application No. 10 2005 023 489.5, filed in the Federal Republic of Germany on May 17, 2005, which is expressly incorporated herein in its entirety by reference thereto.

FIELD OF THE INVENTION

The present invention relates to a position-measuring device for determining the position of two objects movable with respect to each other along a measuring direction, as well as to a method for forming a reference pulse for such a position-measuring device.

BACKGROUND INFORMATION

Such a position-measuring device, designated as an interferometer, includes: a first radiation source for emitting electromagnetic beams of rays, e.g., in the form of light; a beam splitter which subdivides the beams of rays emitted by the radiation source in each case into at least a first and a second partial beam of rays, which are oriented parallel to one another after exiting from the beam splitter; a reference reflector arranged in the beam path, of the first partial beam of rays, designated as the reference beam path, by which the first partial beam of rays is reflected back; a measuring reflector that is movable with reference to the reference reflector along the measuring direction, which is arranged in the beam path of the second partial beam of rays designated as measuring beam path and reflects this back; a superposition device for superposing the two partial beams of rays after their reflection at their respectively assigned reflector for generating a measuring signal from which changes in the relative position of the measuring reflector with respect to the reference reflector are derivable; a second radiation source used to generate a reference pulse for emitting additional electromagnetic beams of rays; and a combining device by which the beams of rays generated by the second radiation source are combined into the beam path of the first radiation source, and before the beam splitter of the position-measuring device.

In order to determine the position of two objects that are movable with respect to each other using such a position-measuring device in the form of an interferometer, one of the two objects is connected to the reference reflector and the other object is connected to the measuring reflector that is movable with respect thereto. In response to a movement of the two objects, and thus also the two reflectors with respect to each other, there takes place a periodic change in the measuring signal formed by the superposition of the two partial beams of rays, in the form of an (incremental) interference signal, so that changes in the position of the two reflectors, and thus of the two objects to be measured with respect to each other may be determined with great accuracy. In such a measuring operation, the position-measuring device is operated exclusively using the electromagnetic radiation of the first radiation source, used for generating the incremental interference signal (measuring signal).

In a practical application, if perhaps an interferometer is to be used as an installation measuring system in a machine tool for determining the position of two machine parts that are movable with respect to each other, it is frequently necessary, in the determination of the position, to be able to produce an absolute reference to a specified position of the two reflectors in the measuring range of the interferometer. To do this, it is described, for example, in European Published Patent Application No. 1 068 486, that at least one reference marking may be provided at the reference reflector or at the measuring reflector, which is scannable by a scanning unit arranged at the respectively other reflector, in order to generate a reference pulse signal if the measuring reflector and the reference reflector have a specified position with respect to each other determinable by scanning the reference marking.

A further possibility for generating a reference pulse is to assign a second radiation source to the position measuring device, which emits electromagnetic beams of rays that are used exclusively for purposes of generating a reference pulse, and which for this too (within the scope of reference travel of the position-measuring device) are combined into the beam path of the position-measuring device. For this situation, it is described in Japanese Published Patent Application No. 7-190712 a position-measuring device in the form of an interferometer, in addition to a coherent radiation source (laser) used for generating a measuring signal, may be equipped with an incoherent light source, for example, a superluminescence diode, whose wavelength deviates from that of the laser light, and whose light is combined into the interferometer in addition to the laser light. After passing through the interferometer, the signal beams of rays, that are superposed on each other, of the coherent first radiation source (laser) on the one hand, and the incoherent second radiation source (superluminescence diode) on the other hand, are separated selectively as to wavelength using filters, so that, on the one hand, an interference signal for the position evaluation generated by the laser light that is used as the measuring signal, and, on the other hand, a reference signal used for generating a reference pulse, that is separate from the former and goes back to the light of the incoherent, second radiation source, are present.

Additional position-measuring devices arranged as interferometers, are described in Japanese Published Patent Application No. 5-149708 and Japanese Published Patent Application No. 11-237209, in which, for the generation of a reference pulse using a second radiation source, additional electromagnetic beams of rays are combined into the beam path of the position-measuring device and are subsequently evaluated separately, that is, independently from the actual measuring signal.

Conventional interferometers in which an additional radiation source is used for the generation of a reference pulse whose electromagnetic radiation is analyzed, separated from the actual measuring signal after passing through the interferometer, and separately, may have the disadvantage that additional components may be required, on the one hand for separating of the additional electromagnetic radiation from the measuring signal, and on the other hand for the detection of this radiation.

SUMMARY

Example embodiments of the present invention may provide a position-measuring device that, in a simple construction, may permit the reliable determination of a reference pulse.

According to example embodiments of the present invention, a detection device is arranged in the beam path of the position-measuring device such that, using it, the reference signal formed by superposition of the beam of rays of the first and second radiation source is received, and the detection device is assigned to an evaluation device which is arranged and provided to form a reference pulse by the evaluation of this reference signal.

The design approach hereof is based, e.g., on the consideration that, in response to the utilization of a second electromagnetic radiation source for the generation of a reference pulse, one may do without the use of additional components used only for generating the reference pulse if the reference pulse is not determined only from the electromagnetic radiation that is combined into the position-measuring device using the additional second radiation source provided for this, but rather by the direct evaluation of the reference signal which comes about from the superposition of the beams of rays of both radiation sources. The generation of a reference pulse may take place only with the aid of the components which are required anyway to carry out a measurement using exclusively the measuring signal generated by the first radiation source.

Thus, the detection device provided for the reception of the reference signal is simultaneously also used in order, during operation of the position-measuring device using only the electromagnetic radiation of the first radiation source, to receive the measuring signal created hereby (incremental interference signal), and the assigned evaluation device is provided for evaluating this measuring signal (after conversion into an electrical signal by the detection device).

The reference pulse obtained hereby directly in the interferometer itself may be particularly suitable for a phase-locked and reproducible connection to the signal period of the incremental measuring signal obtained during the subsequent position measuring in the form of an interference signal.

The electronic radiation generated by the first radiation source, on the one hand, and the electromagnetic radiation generated by the additional, second radiation source, on the other hand, may have a different wavelength, so that a beat signal is created as the reference signal.

Furthermore, the coherence length of the electromagnetic radiation generated by the second radiation source may be substantially shorter than the coherence length of the electromagnetic radiation generated by the first radiation source, so that the reference signal (beat signal) generated by the superposition of the electromagnetic radiation of the two radiation sources forms a spatially limited signal packet. Specifically, the electromagnetic radiation generated by the first radiation source may have a coherence length that is substantially longer than the measuring range of the position-measuring device, that is, the maximum path by which the two reflectors may be removed from each other. By contrast, the coherence length of the electromagnetic radiation generated by the second radiation source may be substantially shorter than the measuring range of the position-measuring device.

A laser may be used as the first radiation source, which has a sufficiently great coherence length, for example, an HeNe laser. A diode may be used as the second radiation source, whose radiation has a sufficiently short coherence length, for example, a superluminescence diode or a laser diode, which is not operated as a laser, but in spontaneous emission.

The second radiation source is arranged such that it may be switched on selectively during the operation of the position-measuring device, e.g., at such a time when, during a reference movement of the position-measuring device, by movement of the two reflectors towards each other, a reference signal is to be formed, and from this a reference pulse is to be formed, whereas it is deactivated in the usual measuring operation of the position-measuring device, e.g., when the two reflectors are moved toward each other for the determination of the position of two objects movable towards each other.

The combining device assigned to the second radiation source is arranged in the beam path of the position-measuring device such that the combining of the beams of rays generated by the second radiation source into the electromagnetic radiation generated by the first radiation source takes place before the beam splitter of the position-measuring device. By contrast, the detection device provided for receiving the reference signal (and also the measuring signal in normal measuring operation of the position-measuring device) is arranged in the beam path of the position-measuring device such that the partial beams of rays reflected by the two reflectors are incident upon the detection device only after their subsequent superposition, where the electromagnetic signals (light signals) are converted into electrical signals, which are supplied, possibly after additional processing and interpolation, to an evaluation device.

The evaluation device is provided for forming a reference pulse at a specifiable position of the two reflectors to each other, that is ascertainable by evaluation of the reference signal, e.g., a position of the two reflectors to each other in which the proportion, reflected by the reference reflector, of the electromagnetic radiation, on the one hand, and the proportions of the electromagnetic radiation reflected by the measuring reflector, on the other hand, demonstrate the same optical path length in the position-measuring device.

The evaluation device is arranged for evaluating a reference signal which is received at the detection device in response to a motion of the measuring reflector with respect to the reference reflector within the scope of a reference movement, e.g., at the simultaneous operation of the first and the second radiation source, the measuring reflector and the reference reflector, during the reference movement, being, e.g., moved at a constant speed relative to each other.

The envelope of the reference signal developed as a beat signal may be evaluated, e.g., with regard to the occurrence of extreme values (minima and maxima). The separation of the envelope of the reference signal may, in this context, take place in a conventional manner using a suitable filter, such as a bandpass filter, for example.

The evaluation unit may be arranged, during a reference movement of the measuring reflector with respect to the reference reflector at a specified, known speed, at the operation of both radiation sources for generating the reference signal, to ascertain the deviation of the measured position, conditional upon the switching in of the second radiation source, from the position which would have been expected at a usual position measuring, while using only the electromagnetic radiation of the first radiation source. Especially in response to a reference movement having a constant speed, there would result, in a position measuring only while using the electromagnetic radiation of the first radiation source, a linear dependence of the position on the time (during the motion of the two reflectors with respect to each other). By superposition of the electromagnetic radiation of the second radiation source, having a comparatively short coherence length, there is created a superposed nonlinear component (beat signal), spatially limited by the short coherence length, from which information about the absolute position of the two reflectors with respect to each other may be ascertained, e.g., by determination of the zero crossings of the nonlinear component of the position signal.

The evaluation device may be arranged for the combined execution of the two above-described evaluation methods, whereby a particularly great reliability may be achieved, which is described in greater detail below.

Methods for determining a reference pulse for a position-measuring device are also described herein.

According to an example embodiment of the present invention, a position-measurement device for determining positions of two objects movable with respect to each other along a measurement direction includes: a first radiation source adapted to emit first electromagnetic beams of rays; a beam splitter adapted to split each beam of rays emitted by the radiation source into at least one first partial beam of rays and one second partial beam of rays; a reference reflector arranged in a beam path of the first partial beam of rays; a measurement reflector movable with respect to the reference reflector along the measuring direction and arranged in a beam path of the second partial beam of rays; a superposition device adapted to superpose the first partial beam of rays and the second partial beams of rays after reflection of the first partial beam of rays by the reference reflector and after reflection of the second partial beam of rays by the measurement reflector; a second radiation source adapted to emit a second electromagnetic beams of rays; a combining device adapted to combine the second electromagnetic beams of rays into a beam path of the first electromagnetic beam of rays generated by the first radiation source; a detection device adapted to receive a reference signal generated by superposition of the first electromagnetic beams of rays and the second electromagnetic beams of rays; and an evaluation device adapted to form a reference pulse as a function of a position of the reference reflector and the measurement reflector with respect to each other by evaluation of the reference signal.

The first radiation source and the second radiation source may be adapted to emit electromagnetic beams of rays of different wavelengths so that the reference signal constitutes a beat signal.

The second radiation source may be adapted to generate the second electromagnetic beams of rays having a coherence length substantially shorter than a coherence length of the first electromagnetic beams of rays.

The first radiation source may be adapted to generate the first electromagnetic beams of rays having a coherence length substantially greater than a measurement range of the position-measurement device defined as a maximum path by which the reference reflector and the measurement reflector are movable from each other along the measuring direction.

The second radiation source may be adapted to generate the second electromagnetic beams of rays having a coherence length substantially shorter than a measurement range of the position-measurement device defined as a maximum path by which the reference reflector and the measurement reflector are movable from each other along the measuring direction.

The first radiation source may include a laser adapted to generate the first electromagnetic beams of rays.

The second radiation source may include a diode, e.g., a superluminescence diode, adapted to generate the second electromagnetic beams of rays.

The diode may include a laser diode operated below a laser threshold.

The laser diode may be operable in a spontaneous emission mode.

The position-measurement device may include a high-frequency modulator assigned to the second radiation source.

The second radiation source may be switchable on for generation of the reference signal and switchable off for generation of a measurement signal.

The combining device may be arranged upstream of the beam splitter.

The detection device may be arranged downstream of the superposition device.

The evaluation device may be adapted to form a reference pulse at a specifiable position of the reference reflector and the measurement reflector with respect to each other.

The evaluation device may be adapted to form the reference pulse at a position of the reference reflector and the measurement reflector with respect to each other at which a same optical path length is present in the beam paths of the first partial beam of rays and the second partial beam of rays.

The evaluation device may be adapted to evaluate the reference signal created in response to a motion of the measurement reflector with respect to the reference reflector during operation of both the first radiation source and the second radiation source.

The evaluation device may be adapted to evaluate the reference signal created in response to a motion of the measurement reflector with respect to the reference reflector at constant speed during operation of both the first radiation source and the second radiation source.

The evaluation device may be adapted to evaluate a measurement signal created during a motion of the reference reflector and the measurement reflector with respect to each other in exclusive operation of the first radiation source.

The evaluation device may be adapted to evaluate an envelope curve of the reference signal.

The evaluation device may be adapted to evaluate extreme values of the envelope curve.

The evaluation device may be adapted to evaluate maxima and minima of the envelope curve.

The position-measurement device may include a filter, e.g., a bandpass filter, adapted to separate the envelope curve of the reference signal.

The evaluation device may be adapted to ascertain a position signal from the reference signal to form a reference pulse during a relative motion of the reference reflector and the measurement reflector having a specified speed at simultaneous operation of the first radiation source and the second radiation source, and a deviation designated as a position deviation of the position signal may be determined and evaluated by an expected position signal in exclusive operation of the first radiation source.

The evaluation device may be adapted to evaluate a non-linear portion of the position signal ascertained from the reference signal to form the reference pulse.

The evaluation device may be adapted to evaluate the position signal ascertained from the reference signal by determination and evaluation of a position of at least one of (a) zero crossings and (b) extreme values of the position deviation.

The evaluation device may be adapted to evaluate the envelope curve of the reference signal and for a position deviation of the reference signal.

The position-measurement device may include an optical delay line arranged in the beam path of at least one of (a) the first partial beam of rays and (b) the second partial beam of rays.

The combining device may be adapted to combine the first electromagnetic beam of rays and the second electromagnetic beam of rays into a light guide.

The position-measurement device may include a collimator arranged behind the light guide on an exit side.

The collimator may include an achromatic collimator.

The position-measurement device may include a $\lambda/4$ plate arranged as a delay device between the superposition device and the detection device.

The $\lambda/4$ plate may include a two-wavelength delay plate.

According to an example embodiment of the present invention, a method for forming a reference pulse in a position-measurement device, e.g., having features such as those described above, includes: emitting first electromagnetic beams of rays by a first radiation source; splitting the first electromagnetic beams of rays in a beam splitter into at least one first partial beam of rays and at least one second partial beam of rays; reflecting the first partial beam of rays and the second partial beam of rays by a respective one of a reference reflector and a measurement reflector; superposing the first partial beam of rays and the second partial beam of rays in a superposition device after the reflecting; emitting second electromagnetic beams of rays by a second radiation source; combining the second electromagnetic beams of rays into a beam path of the first electromagnetic beams of rays before the beam splitter; receiving a reference signal by a detection device arranged behind the superposition device generated by superposition of the first electromagnetic beams of rays and the second electromagnetic beams of rays; and evaluating the reference signal by an evaluation device to form a reference pulse in a specified position of the reference reflector and the measurement reflector with respect to each other.

The first electromagnetic beams of rays and the second electromagnetic beams of rays may have different wavelengths.

The second electromagnetic beams of rays may have a coherence length substantially shorter than a coherence length of the first electromagnetic beams of rays.

The second radiation source may be operated exclusively during a reference movement of the position-measurement device for generating the reference signal.

The evaluation device may form the reference pulse by evaluating the reference signal when a same optical path length is present in beam paths of the first and second partial beams of rays.

The method may include moving the measurement reflector at a specified speed with respect to the reference reflector for generating the reference signal.

The measurement reflector may be moved in the moving step at a constant speed with respect to the reference reflector.

The method may include evaluating an envelope curve of the reference signal in the evaluation device The method may include evaluating an envelope curve of the reference signal in the evaluation device with respect to a position of minima and maxima of the envelope curve.

The method may include: ascertaining a position signal in the evaluation device from the reference signal for the formation of the reference pulse during a relative motion of the reference reflector and the measurement reflector at a specified, known speed; and determining and evaluation a deviation designated as a position deviation of the position signal by an expected position signal in exclusive operation of the first radiation source.

The method may include evaluating a nonlinear component of the position signal by the evaluation device.

The method may include evaluating zero crossings of the position deviation by the evaluation device.

The method may include evaluating by the evaluation device both an envelope curve of the reference signal and a position deviation of the reference signal for the formation of the reference pulse.

Further features and aspects of example embodiments of the present invention are described in more detail below with reference to the appended Figures.

BRIEF DESCRIPTION OF THE DRAWINGS

FIG. 2a is a circuit diagram of a first part of a position-measuring device in the form of an interferometer which is operable during a reference movement using the light of two light sources.

FIG. 2b illustrates a second part of the position-measuring device illustrated in FIG. 2a.

FIG. 6a illustrates a position signal generated while using the position-measuring device illustrated in FIGS. 2a and 2b, if the position-measuring device is being operated during a reference movement using both light sources.

FIG. 6b illustrates a nonlinear component of the position signal illustrated in FIG. 6a.

DETAILED DESCRIPTION

Figure 1:
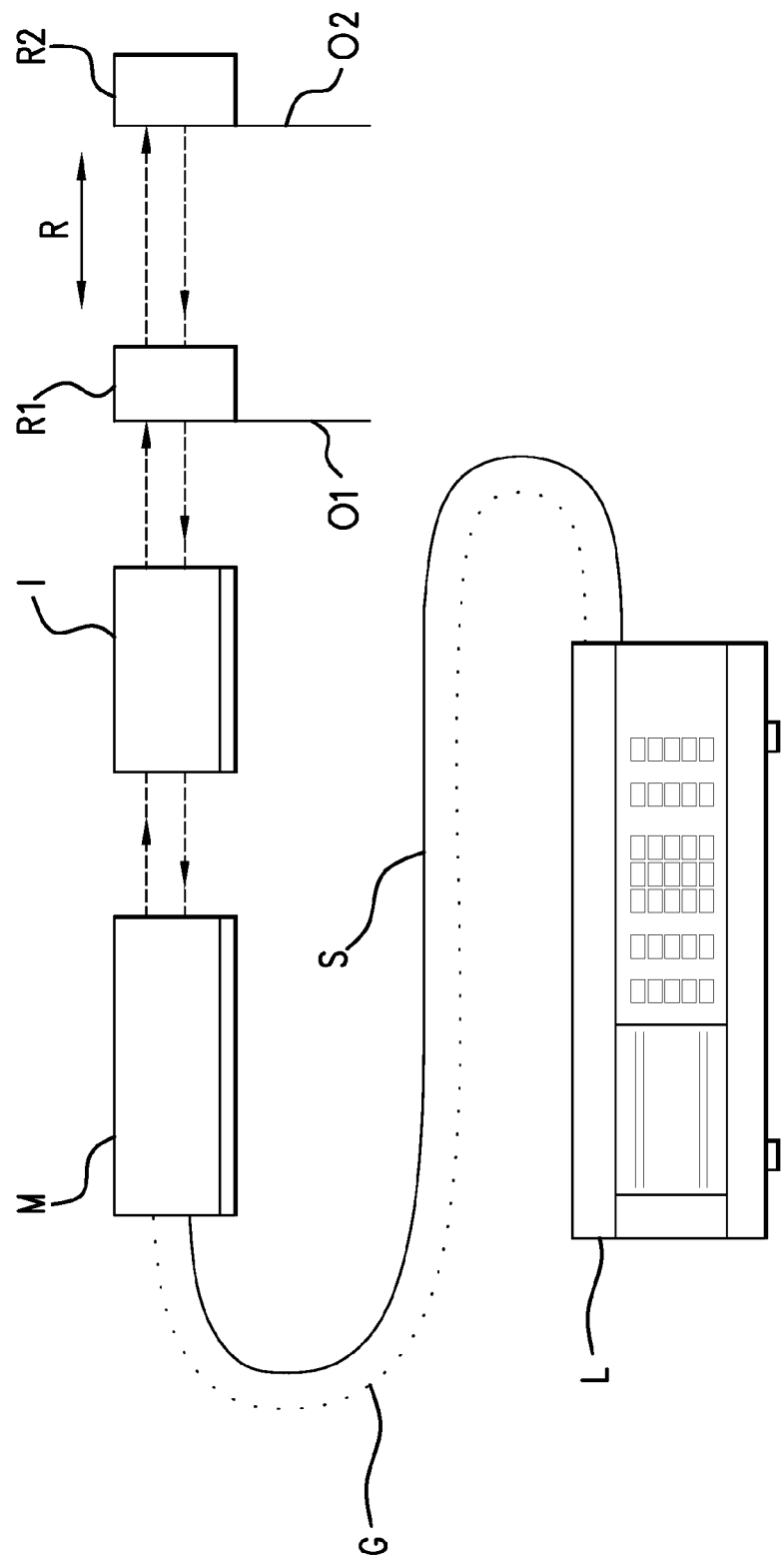
FIG. 1 is a schematic view of a position-measuring device in the form of an interferometer.

FIG. 1 illustrates a position-measuring device for determining the position of two objects O1, O2 that are movable along a measuring direction R with respect to each other, in the form of a so-called interferometer or, more accurately, of a laser interferometer (Michelson interferometer).

This includes a radiation source (light source), arranged in a laser module and evaluation module L, for generating an electromagnetic radiation (light) having great coherence length, e.g., a coherence length that is clearly greater than the optical path length that is traversed by the light generated by laser and evaluation module L in the interferometer during a position measurement. An HeNe laser may be suitable for this, for example, as a component of laser and evaluation module L.

Laser and evaluation module L is connected via a fiber optic connection G to a measuring head M, which includes a collimator for parallelizing the laser light that is generated in laser and evaluation module L and passed on with the aid of fiber optic connection G. An interferometer optical system I is connected behind measuring head M, to which the laser light collimated in measuring head M is supplied, and which generates two equal, parallel partial beams of rays, which are respectively supplied to one of two reflectors R1, R2, which are movable with respect to each other in the measuring direction. Reflectors R1, R2 are, for example, so-called retroreflectors, e.g., in the form of triple prisms that reflect the respective partial beam of rays, and guide it back to interferometer optical system 1. At that point, the two partial beams of rays are superposed on each other, and they then reach a group of photoreceivers arranged in measuring head M, which convert the light intensities of the superposed partial beams of rays, modulated as a function of the distance apart of the two reflectors R1, R2, into electrical signals.

Measuring head M is connected to laser and evaluation module L via a signal line S, for passing on the electrical signals. The electrical signals supplied to laser and evaluation module L via signal line S are able to be processed further in laser and evaluation module L, e.g., the position information may be gathered from which the position changes of the two reflectors R1, R2 are ascertainable with respect to each other and very precisely determinable.

Using the interferometer when there is a motion of the two objects O1, O2 with respect to each other, the position change of the one object O2 with respect to the other object O1 may be measured, in that the two objects O1, O2, whose position with respect to each other is to be determined with the aid of the interferometer, are connected respectively to one of the two reflectors R1, R2. In this context, as a rule, measuring is involved of the position changes of a movable object O2 with respect to a fixed object O1. Reflector R1, connected to fixed object O1, is designated as reference reflector, and reflector R2, connected to movable object O2, is designated as measuring reflector.

With regard to the two objects that are movable with respect to each other, of which the one is connected to the measuring reflector and the other is connected to the reference reflector, for example, two machine parts of a machine tool may be involved, e.g., a movable machine part that is to be connected to the measuring reflector and a stationary machine part that is to be connected to the reference reflector.

The cooperation as well as the more exact construction of the components of an interferometer of the kind illustrated in FIG. 1 is described below with reference to FIGS. 2a and 2b, additional device(s) means being provided for forming a reference pulse at a certain position of the two reflectors R1, R2 (and thus also of the two objects O1, O2) to each other. The measured position changes may then be referred to a certain relative position of the two reflectors R1, R2 or the two objects O1, O2, so that not only position changes of the two reflectors R1, R2 or the two objects O1, O2 are determinable, but also their exact position with respect to each other.

As illustrated in FIG. 2a, the interferometer includes as radiation source or light source a laser 1, having great coherence length, such as an HeNe laser, that generates laser light having a wavelength of, e.g., 633 nm.

Beam of rays B1 generated by that laser 1 are supplied via a lens 30 and a fiber optic guide 4, such as in the form of a fiber optic connection, to an optical system forming a collimator 5, in which the beams of rays B1 generated by laser 1 are collimated.

The collimated light is supplied to an interferometer optical system having a beam splitter 6, the beam splitter being able to be arranged, for example, as described in European Published Patent Application No. 1 031 868, as a compensated parallel beam splitter from two easily producible, parallel glass plates 61, 62, of which one is used as a beam splitter element and the other as a compensating element. The two plates 61, 62 are tilted at the so-called Brewster's angle with respect to the incident, parallelized laser light, and at the output end they generate two exactly parallel beams of rays $T_M$, $T_R$, of which the one is s-polarized and the other is p-polarized. European Published Patent Application No. 1 031 868, which is expressly incorporated herein in its entirety by reference thereto, provides additional details on the construction and the function of such a compensated parallel beam splitter.

The one partial beam of rays $T_M$ is incident upon a measuring reflector 8, and the other partial beam of rays $T_R$ is incident upon a reference reflector 7, arranged in each case, e.g., as triple prisms, and, as illustrated in FIG. 2b, is reflected by the respective reflector 7, 8 such it is guided back to the interferometer optical system or rather, to its beam splitter 6, where the two reflected partial beams of rays $T_M'$, $T_R'$ are superposed. The beam of rays resulting from the superposition, as a signal beam of rays, then reaches detectors 95 of a detecting device 9 that are arranged as photoreceivers having analyzers oriented in a manner rotated to each other, via a retarding element in the form of a λ/4 plate 91 and a lens 92 having a grating. At that place, interference occurs, and the measuring signals generated by the superposition of the two reflected partial beams of rays $T_M'$, $T_R'$ are converted into electrical signals which, using an (electrical) signal line 96, are supplied to an adaptation electronic system 97, for further processing, that may be integrated into a laser module and assigned to laser 1, and which converts the supplied signals into usual quadrature signals. In an evaluation device 98, connected to adaptation electronic system 97 via a suitable interface, which may also be arranged in the laser module, takes place an evaluation of the electrical signals, from which changes in the position of measuring reflector 8 with respect to reference reflector 7 may be ascertained.

If the wavelength of second light source 2 is clearly different from the wavelength of light source 1, it may be provided to use a so-called two-wavelength retardation for λ/4 plate 91, which effects the desired λ/4 retardation for both wavelengths.

Since a periodic signal is involved, when it comes to the light signal (measuring signal and interference signal) that is generated by superposing the two reflected partial beams of rays $T_M'$, $T_R'$, which in the case of the linear interferometer, illustrated in FIGS. 2a and 2b, oscillates at half the wavelength of the laser light generated by laser 1, then by evaluating this signal, or the electrical signals generated from it, only a determination of changes of the position of measuring reflector 8 with respect to reference reflector 7 is possible. For, the measuring signal generated by the superposition oscillates periodically as a function of the position of measuring reflector 8 with respect to reference reflector 7, and receives no information that would permit a determination of the absolute position of measuring reflector 8 with respect to reference reflector 7.

For this reason, it may be required in many application cases to provide additional device(s) for generating a reference pulse which is formed in response to a certain specifiable position of the two reflectors 7, 8. As the reference position of the two reflectors 7, 8 with respect to each other, in which a reference pulse is formed, that position may be suitable in which the components of the laser light generated by laser 1, e.g., the components of the laser light reflected by measuring reflector 8, have the same optical path length as the components of the laser light occurring in the reference beam path, e.g., the reflected components of the laser light reflected by reference reflector 7.

An additional radiation source in the form of a light source 2 may be provided for generating a reference pulse, in which, for example, a laser diode operating in spontaneous emission, or a superluminescence diode may be provided. The electromagnetic radiation, in the form of light, that is generated by this light source 2, has a different wavelength, such as 655 nm, from that of the laser light generated by laser 1, which may have a wavelength such as 633 nm.

Furthermore, the electromagnetic radiation in the form of light, generated by additional light source 2, may have a considerably lower coherence length than that of the laser light generated by laser 1. While the coherence length of the laser light is clearly greater than the measuring range of the position-measuring device illustrated in FIGS. 2a and 2b, e.g., clearly greater than the maximum path by which the two reflectors 7, 8 of the position-measuring device are able to be removed from each other along measuring direction R, the coherence length of the light generated by additional light source 2 may be considerably smaller than that measuring range, and is, for example, of the order of magnitude of a few 10 μm.

The light generated by additional light source 2 is superposed, via a combining device 3, on the beam path of the laser light generated by laser 1, so that beams of rays and beams of light B1, on the one hand, and beams of rays and beams of light B2 generated by additional light source 2, on the other hand, may be combined via lens 30 into light guide 4. The use of a light guide 4 may be of special advantage, in this context, since after the collimation at the exit-end fiber end the two superposed beams of rays of different wavelengths are automatically oriented exactly parallel to each other, using collimator 5. If the wavelength of second light source 2 is clearly different from the wavelength of first light source 1, it may be provided to use an achromatic collimator as collimator 5.

Combining device 3 is connected behind laser 1 such that beams of rays B1, generated by laser 1, are superposed by beams of rays B2 generated by additional light source 2, before the radiation or the light is supplied to beam splitter 6 via light guide 4 and collimator 5. In this context, the beam splitter layers of beam splitter 6 are dimensioned so that they are effective for the wavelength of both the laser light of laser 1 and the light of additional light source 2.

Additional light source 2 is switched off in the measuring operation of the position-measuring device, e.g., it then generates no electromagnetic radiation in the form of light, so that the position-measuring device is operated exclusively using the laser light of laser 1. Switching in additional light source 2 takes place exclusively during a so-called reference movement, during which the two reflectors 7, 8 of the position-measuring device are moved with respect to each other, in order to ascertain the relative position of the two reflectors 7, 8 in which a reference pulse is formed. This may particularly involve that relative position of the two reflectors 7, 8 in which the optical path lengths of the measuring arm of the position-measuring device, on the one hand, and of the reference arm of the position-measuring device, on the other hand, agree, at which, e.g., the components of the light combined into the position-measuring device reflected at measuring reflector 8 (generated, on the one hand, by laser 1 and, on the other hand, by additional light source 2) have the same path length as the light components reflected at reference reflector 7.

In such application cases in which, based on the situation of measuring reflector 8, on the one hand, and reference reflector 7, on the other hand, optical path length equality is not simply to be produced within the mechanical travel range, a so-called optical retarding line V may optionally be connected, as illustrated in FIG. 2b, in the measuring arm or in the reference arm.

Figure 3:
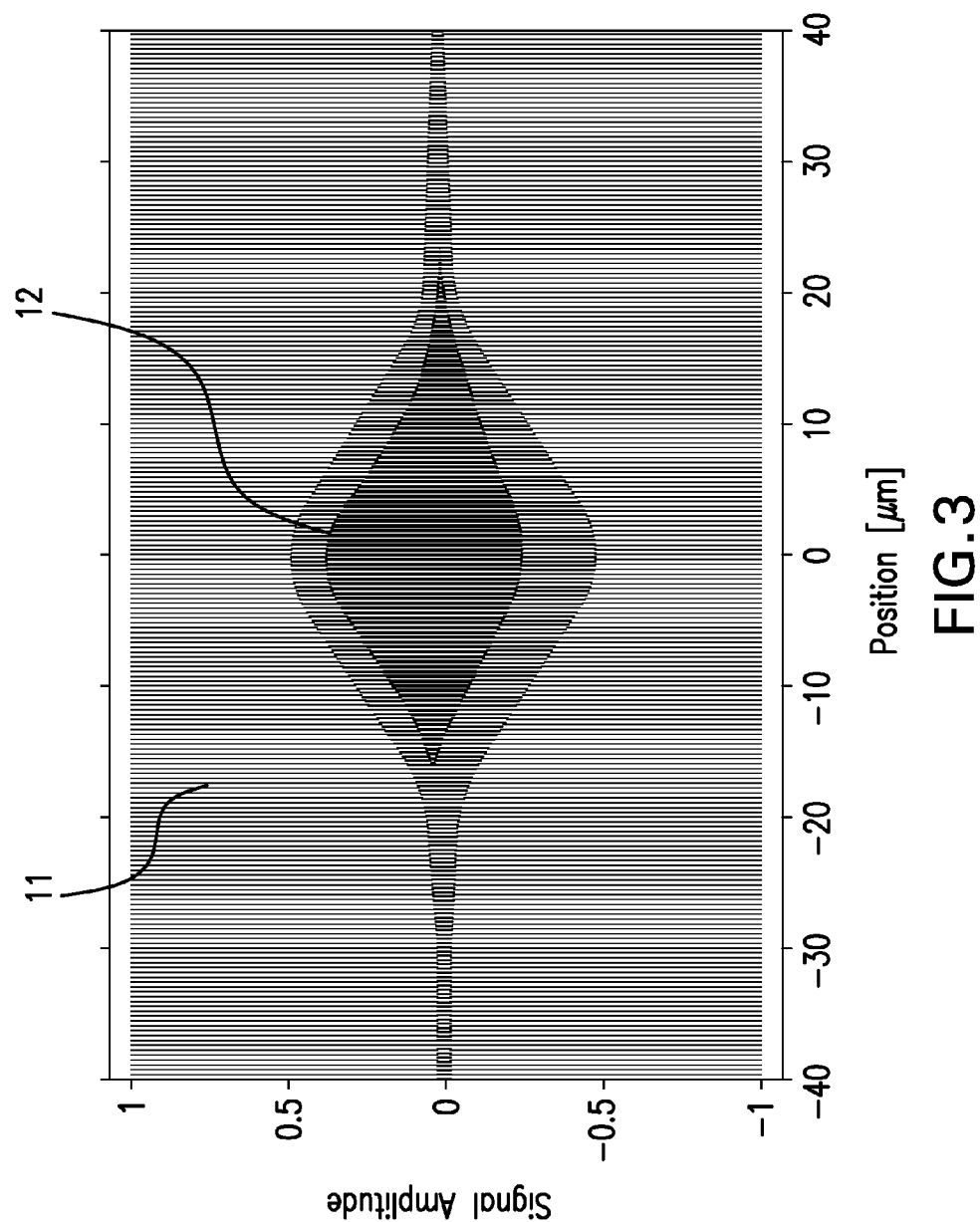
FIG. 3 illustrates signals generated using the position-measuring device, if it is being operated exclusively using the light of the one or the other light source.

In order to compare the properties of the two light sources, e.g., laser 1, on the one hand, and additional light source 2, on the other hand, the respective interference signal 11, 12 is illustrated in FIG. 3, which is created when the position-measuring device illustrated in FIGS. 2a and 2b is operated only using one of the two light sources 1, 2.

When the position-measuring device is operated using laser 1, that is provided for the position measuring, which generates coherent laser light, interference signal 11 comes about as the measuring signal which is a zero point-symmetrical quadrature signal, whose signal period, in the case of the linear interferometer illustrated in FIGS. 2a and 2b, oscillates at one-half the wavelength of the laser light generated by laser 1. In this context, interference signal 11 is plotted as a function of the relative position of the two reflectors 7, 8 with respect to each other, the position 0 designating that case in which the optical path length equality in the measuring arm of the position-measuring device, on the one hand, and its reference arm, on the other hand, is present.

Based on the periodicity of interference signal 11, using the position-measuring device, as described above, only changes in the position of measuring reflector 8 with respect to reference reflector 7 are determinable, which are yielded from the number of signal periods of interference signal 11 running through in response to a relative motion. Based on the great coherence length of laser 1 used for the measuring operation of the position-measuring device, no reduction in the signal magnitude occurs in the measuring range of the position-measuring device, e.g., the amplitude of interference signal 11 in the measuring range of the position-measuring device is constant, independently of the relative position of the two reflectors 7, 8.

On the other hand, if the position-measuring device in the form of an interferometer is (hypothetically) operated exclusively using the light generated by additional light source 2, the interference signal designated by 12 in FIG. 3 would be generated in the form of a quadrature signal that oscillates at one signal period equal to half the wavelength of the light generated by the additional light source 2. Because of the short coherence length of the light generated by additional light source 2, which may be achieved, for example, by operating an additional light source 2 in the form of a laser diode using an injection current below the laser threshold, this interference signal 12 falls off greatly, starting from the zero point representing the optical path length equality.

The light radiated by additional light source 2 thus generates a significant interference signal 12 only when the relative position of the two reflectors 7, 8 of the position-measuring device is in a small range amounting, e.g., to a few 10 μm about the reference position, in which optical path length equality prevails.

The case last described, however, in which the position-measuring device in the form of an interferometer is operated exclusively using additional light source 2 of short coherence length, is not considered to be important in practice. Rather, the position-measuring device is operated either in the so-called measuring operation, operated exclusively using laser 1, which generates a laser light of great coherence length, or, in the case of a so-called reference excursion, using both laser 1 and additional light source 2. In such a reference movement, the two reflectors 7, 8 are shifted with respect to each other in their measuring range, in order to ascertain a certain relative position used as reference position, in which a reference pulse is generated during the reference movement. As the reference position, in this context, e.g., that position of the two reflectors 7, 8 may be used in which path length equality in the measuring arm and the reference arm of the position-measuring device is present.

Figure 4:
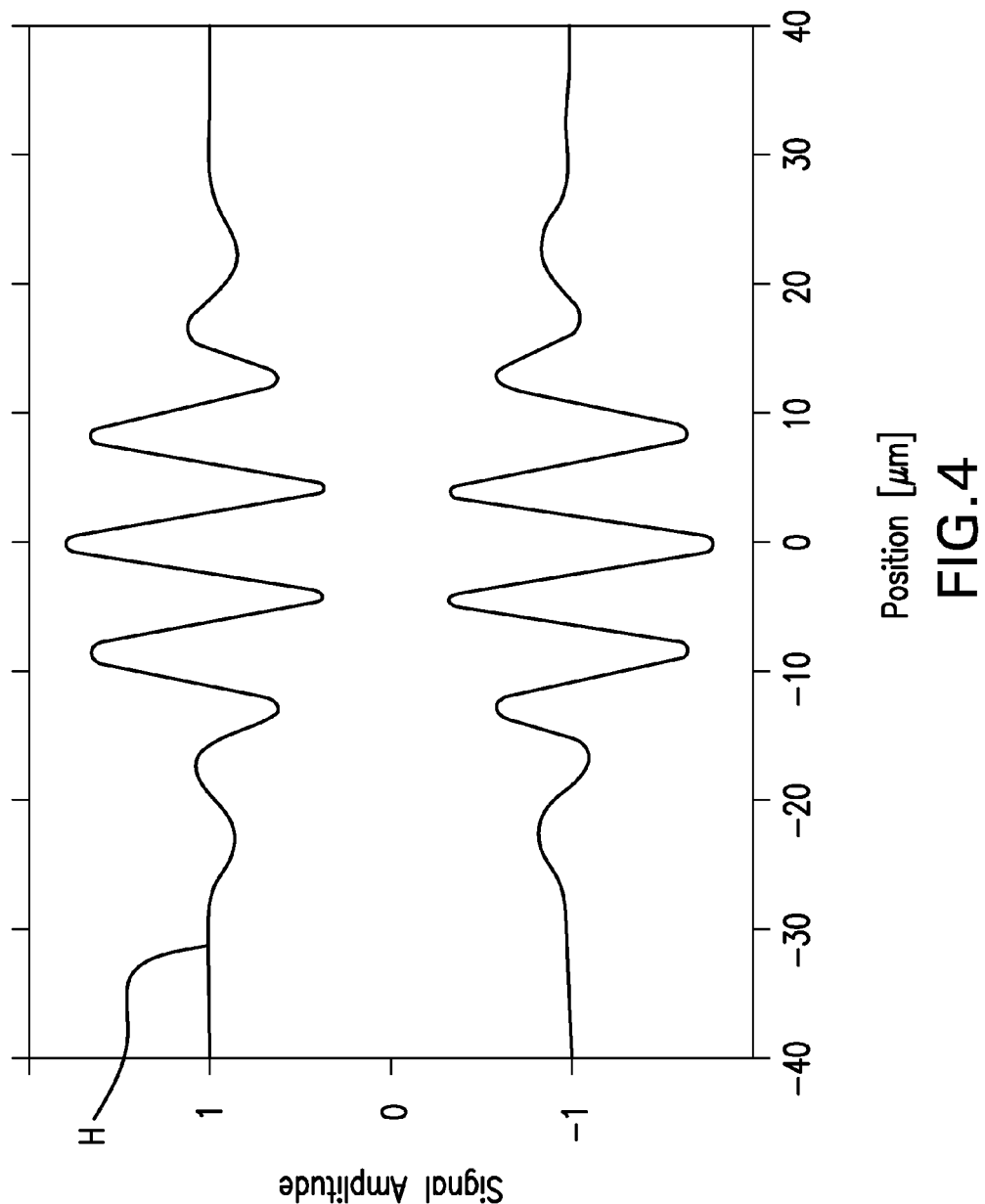
FIG. 4 illustrates a beat signals generated in the position-measuring device, if it is being operated using both light sources.

FIG. 4 illustrates the envelope of the beat signal which, in the case of the position-measuring device in the form of an interferometer illustrated in FIGS. 2a and 2b, is present at detectors 95 (photoreceivers) if, during a reference movement of the position-measuring device, in which the two reflectors 7, 8 are adjusted in the measuring direction R with reference to each other, both laser 1 and additional light source 2 are operated. In this context, as illustrated in FIG. 2a, the light generated by additional light source 2 is superposed by the light generated by laser 1 by combining, before the light signal created by the superposition is supplied to the interferometer optical device and then to reflectors 7, 8.

The beat signal created because of the different wavelengths of the two light sources 1, 2 has a signal period of half the beat wavelength, the beat length wave being given by $\lambda=\lambda_1{}^*\lambda_2/(\lambda_2-\lambda_1)$. In this equation, $\lambda_1$ represents the wavelength of the light generated by laser 1, and $\lambda_2$ represents the wavelength of the light generated by additional light source 2. Based on the above wavelengths of 633 nm for the laser light and 655 nm for the light generated by the additional light source, a beat wavelength of 18.8 μm is obtained. In the position-measuring device in the form of a linear interferometer illustrated in FIGS. 2a and 2b, the signal period of the beat oscillation illustrates in FIG. 4 amounts to one-half of that beat wavelength. In a differential plane reflector interferometer, the signal period of the beat would amount to one-quarter of the beat wavelength.

During the adjustment of the position of the two reflectors 7, 8 (cf., FIGS. 2a and 2b) with respect to each other for the purpose of carrying out a reference movement, the beat oscillations illustrated in FIG. 4, conditioned upon the short coherence length of the light generated by second light source 2, appear in only a small position range about the reference position designated as zero point, in which the optical wavelength equality in the measuring arm and the reference arm of the position-measuring device prevails. If the distance between the two reflectors 7, 8 deviates by more than a few 10 μm from the reference position designated as the zero point position, no beat oscillations take place, as may be recognized in accordance with FIG. 4. As illustrated in FIG. 4, during deviations of the relative position of the two reflectors 7, 8 from the reference position placed in the zero point by more than 30 μm, no significant beat oscillations may occur any more.

The intensity ratio of radiation generated by the two light sources 1, 2 (cf., FIG. 2a) is selected, in this context, such that the envelope curve of the beat signal does not vanish, that is, does not have any zero crossings. In the example illustrated in FIG. 4, the amplitude of the light radiation generated by additional light source 2 is half as great as the amplitude of the laser light generated by laser 1.

Figure 5:
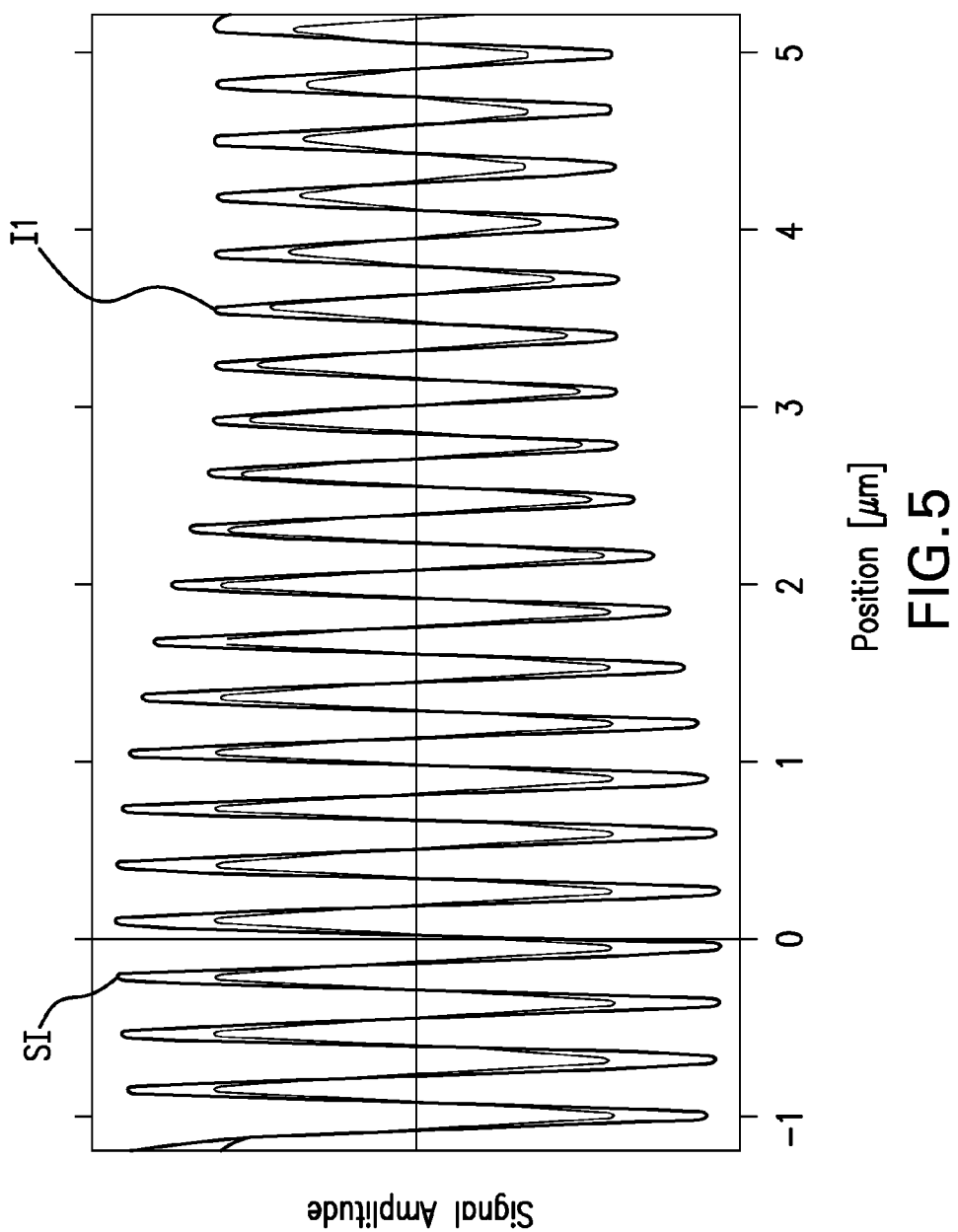
FIG. 5 illustrates a portion of the signal illustrated in FIG. 4.

FIG. 5 illustrates a section from FIG. 4 in a position range between −1 μm to 5 μm, about the reference position (zero point position) of the two reflectors 7, 8. In this context, beat signal SI itself, that is present at detectors 95 (cf., FIG. 2b) of the position-measuring device, may be recognized, and not only its envelope curve, as in the case of the overview representation illustrated in FIG. 4. Furthermore, incremental signal I1 is illustrated for comparison, which in that case is present at detectors 95 of the position-measuring device, that the latter is only being operated using the laser light of laser 1.

It may be seen that, starting from the reference or zero point position (position 0 μm), at which in the measuring arm and reference arm of the position-measuring device optical path length equality prevails, the phase of beat signal SI, assuming phase equality at the reference position or zero point position, first extends ahead of incremental interference signal I1, generated only by the laser light, until after one-quarter of the beat wavelength, e.g., after one-half the signal period of the beat oscillation of beat signal SI, phase equality is again present. As illustrated in FIG. 5, this place is near a deviation of the relative position of the two reflectors 7, 8 by 4.7 μm from the reference position or zero point position having optical path length equality, that is, at position value 4.7 μm.

At position value 4.7 μm, the sign of the phase difference reverses itself, e.g., beat signal SI then extends behind incremental interference signal I1, etc. Thus the difference in the two phase positions forms a difference signal having a signal period which is equal to one-half the beat wavelength, thus 9.4 μm in the case at hand, this difference signal occurring only with the coherence length of the light generated by second light source 2, e.g., in a range of a few 10 μm about position value 0.

Since, however, upon performing a reference movement of the position-measuring device to form a reference pulse, during the operation of the position-measuring device, exclusively the reference signal and beat signal SI generated both using laser 1 and also using additional light source 2, but not at the same time also the incremental measuring or interference signal I1 exclusively generated by the laser is present, the ascertainment of the reference position or zero point position of the two reflector 7, 8 (cf., FIGS. 2a and 2b) cannot take place by a combined evaluation both of beat signal SI and of interference signal I1. In place of interference signal I1, time may therefore be used for position reference. For this, the two reflectors 7, 8 or objects O1, O2 that are movable with respect to each other and are connected to the two reflectors, are moved at constant speed in the measuring range of the position-measuring device, during the reference movement.

Figure 6B:
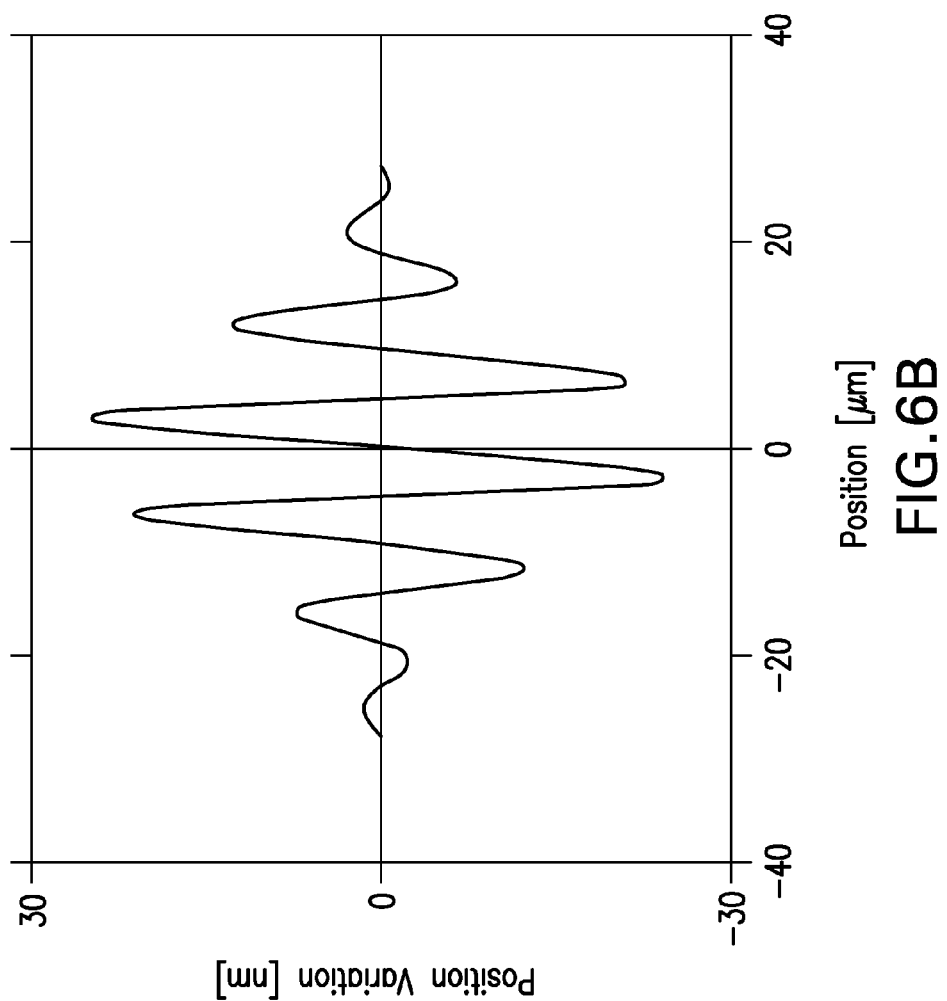

As illustrated in FIG. 6a, in this context, outside the coherence range of the second light source, there comes about, around the reference point or zero point, a linear, time-dependent position signal corresponding to a linear change in the position of the two reflectors 7, 8 with respect to each other as a function of time, during the performance of the reference movement at constant speed. In the environment of the reference position or zero point position, incremental interference signal I1 (cf., FIG. 5), with the aid of which the linear dependence of the position of the two reflectors 7, 8 with respect to each other is ascertainable, is characterized by a nonlinearity, which is based on the influence of the second light source 2, or rather the light emitted by it, that is effective in this range. This deviation from linearity, also designated below as position deviation from linearity, is illustrated enlarged in FIG. 6b.

Starting from this, the reference position or null position of the two reflectors 7, 8 of the position-measuring device may be determined as zero crossing between the maximum and the minimum deflection of the nonlinearity, or even as the average zero crossing of the nonlinearity. The position deviations from linearity may amount only to a few 10 nm. However, the mechanical stability of highly accurate carriages for nano-technology, etc., is sufficient for being able to record such small deviations.

Alternatively to the ascertainment, described above, of the reference position or the zero point position by the ascertainment of nonlinear position deviations during a reference movement of the position-measuring device at constant speed, an evaluation can also be made of envelope curve H of the beat signal illustrated in FIG. 4, which may be gathered using a bandpass filter. The reference position or zero point position is then defined as that position of the two reflectors 7, 8 of the position-measuring device at which the envelope curve H of the beat signal has a maximum. However, this method for determining the reference position or the zero point position may be less accurate than the ones described with reference to FIGS. 6a and 6b, since, because of the slight increase in envelope curve H in the vicinity of an extreme value, an exact determination of the extreme point may be more difficult than the ascertainment of the average zero crossing, illustrated in FIG. 6b, of the nonlinear position deviation.

Figure 7:
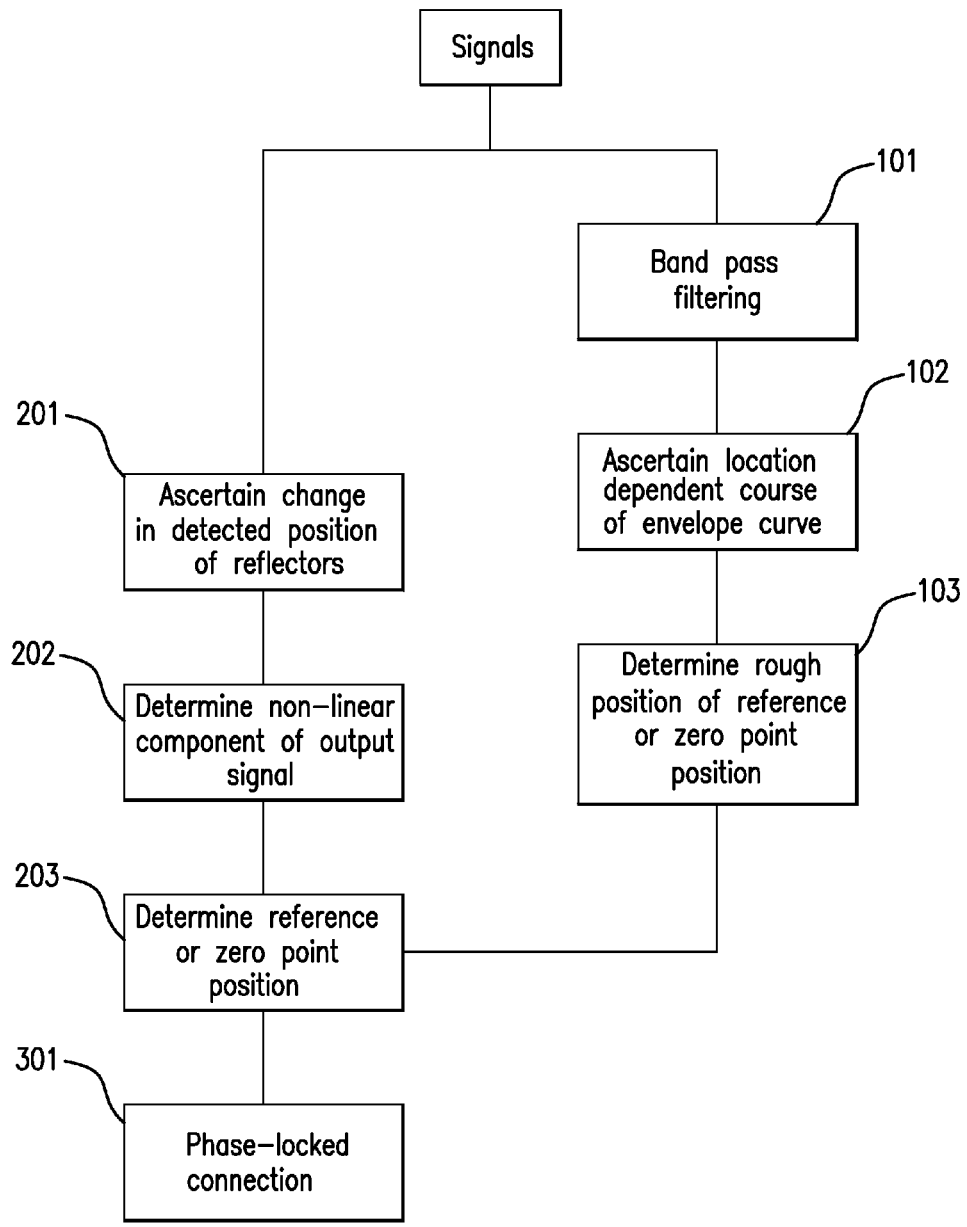
FIG. 7 is a flowchart illustrating a method for ascertaining a reference pulse while using the position-measuring device illustrated in FIGS. 2a and 2b.

A method for determining the zero crossing may include a combination of the two methods described above, as illustrated in FIG. 7. According to this, on the one hand, using bandpass filtering 101, envelope curve H is gathered of beat signal SI, after the latter's conversion to an electrical signal using detectors 95 provided for this (cf., FIG. 2b), and, in a further step 102, the location-dependent course of envelope curve H is ascertained, and, in a subsequent step 103, the rough position of the reference position or zero point position of the two reflectors 7, 8 is determined as the position of the maximum signal magnitude of envelope curve H.

Independently of this, with the aid of the output signal generated in response to the reference movement at constant speed, after conversion into an electrical signal using detectors 95 provided for this, an ascertainment 201 is made of the change in the detected position of the two reflectors 7, 8 with respect to each other as a function of time, as is illustrated in FIG. 6a, as well as a determination 202 of the nonlinear component of the output signal, as is illustrated in FIG. 6b. From this, at 203 the reference position or zero point position of the two reflectors 7, 8 is determined as that position value at which the nonlinear component of the signal, designated as position deviation, has a zero crossing which is in immediate proximity to the maximum signal deflection, determined before at 103, of envelope curve H of beat signal SI.

The position value ascertained from this is then regarded as the reference position or zero point position of the two reflectors 7, 8, which has a phase-locked connection 301 and the signal period, using which, incremental interference signal I1 is triggered, in order thus to be able, in a subsequent position measurement, using the position-measuring device, while exclusively using laser 1 as light source, to relate the generated incremental interference signals I1 unequivocally to the absolute and reproducible reference position or zero point position of the two reflectors 7, 8.

Because of the procedure described for the ascertainment of the reference position or the zero point position of the two reflectors 7, 8, e.g., by the combination of a rough restriction of the position of the reference point or zero point by evaluating envelope curve H and the subsequent precise determination of the reference position or the zero point position with the aid of the average zero crossing of the nonlinear position deviation, not only a highly accurate, but also an extremely reliable ascertainment of the reference position or zero point position may be made possible. This is of significance, e.g., because the coherence function of a spontaneously emitting diode, which may be used as second light source 2 of the position-measuring device, at a distance of a few millimeters has periodically recurrent "peaks" having a gradually decreasing height. The combination method described may prevent erroneously identifying the influence of one of the "secondary peaks" of the coherence function with the reference position or the zero point position of reflectors 7, 8. Alternatively or in supplement, the "secondary peaks" may be suppressed by an additional high frequency modulation.

When using a superluminescence diode as additional light source, such "secondary peaks" may be greatly suppressed from the beginning, and thus they may have only a small signal amplitude.

It should be understood that the foregoing may be used in connection with other interferometer architectures, for example, in differential plane reflector interferometers.

What is claimed is:

1. A position-measurement device for determining positions of two objects movable with respect to each other along a measurement direction, comprising:
   a first radiation source adapted to emit first electromagnetic beams of rays;
   a second radiation source adapted to emit second electromagnetic beams of rays
   a beam splitter adapted to split each beam of rays emitted by the radiation sources into at least one first partial beam of rays and one second partial beam of rays;
   a reference reflector arranged in a beam path of the first partial beam of rays;
   a measurement reflector movable with respect to the reference reflector along the measuring direction and arranged in a beam path of the second partial beam of rays;
   a superposition device adapted to superpose the first partial beam of rays and the second partial beams of rays after reflection of the first partial beam of rays by the reference reflector and after reflection of the second partial beam of rays by the measurement reflector;
   a combining device adapted to combine the second electromagnetic beams of rays into a beam path of the first electromagnetic beam of rays generated by the first radiation source;
   a detection device including a plurality of detectors, each detector adapted to receive the superposed first partial beam of rays and second partial beam of rays superposed by the superposition device, the detection device adapted to form a reference signal generated by superposition of the first electromagnetic beams of rays and the second electromagnetic beams of rays; and
   an evaluation device adapted to form a reference pulse as a function of a position of the reference reflector and the measurement reflector with respect to each other by evaluation of the reference signal.

2. The position-measurement device according to claim 1, wherein the first radiation source and the second radiation source are adapted to emit electromagnetic beams of rays of different wavelengths so that the reference signal constitutes a beat signal.

3. The position-measurement device according to claim 1, wherein the second radiation source is adapted to generate the second electromagnetic beams of rays having a coherence length substantially shorter than a coherence length of the first electromagnetic beams of rays.

4. The position-measurement device according to claim 1, wherein the first radiation source is adapted to generate the first electromagnetic beams of rays having a coherence length substantially greater than a measurement range of the position-measurement device defined as a maximum path by which the reference reflector and the measurement reflector are movable from each other along the measuring direction.

5. The position-measurement device according to claim 1, wherein the second radiation source is adapted to generate the second electromagnetic beams of rays having a coherence length substantially shorter than a measurement range of the position-measurement device defined as a maximum path by which the reference reflector and the measurement reflector are movable from each other along the measuring direction.

6. The position-measurement device according to claim 1, wherein the first radiation source includes a laser adapted to generate the first electromagnetic beams of rays.

7. The position-measurement device according to claim 1, wherein the second radiation source includes a diode adapted to generate the second electromagnetic beams of rays.

8. The position-measurement device according to claim 7, wherein the diode includes a superluminescence diode.

9. The position-measurement device according to claim 7, wherein the diode includes a laser diode operated below a laser threshold.

10. The position-measurement device according to claim 9, wherein the laser diode is operable in a spontaneous emission mode.

11. The position-measurement device according to claim 1, further comprising a high-frequency modulator assigned to the second radiation source.

12. The position-measurement device according to claim 1, wherein the second radiation source is switchable on for generation of the reference signal and switchable off for generation of a measurement signal.

13. The position-measurement device according to claim 1, wherein the combining device is arranged upstream of the beam splitter.

14. The position-measurement device according to claim 1, wherein the detection device is arranged downstream of the superposition device.

15. A position-measurement device for determining positions of two objects movable with respect to each other along a measurement direction, comprising:
- a first radiation source adapted to emit first electromagnetic beams of rays;
- a second radiation source adapted to emit second electromagnetic beams of rays;
- a beam splitter adapted to split each beam of rays emitted by the radiation sources into at least one first partial beam of rays and one second partial beam of rays;
- a reference reflector arranged in a beam path of the first partial beam of rays;
- a measurement reflector movable with respect to the reference reflector along the measuring direction and arranged in a beam path of the second partial beam of rays;
- a superposition device adapted to superpose the first partial beam of rays and the second partial beams of rays after reflection of the first partial beam of rays by the reference reflector and after reflection of the second partial beam of rays by the measurement reflector;
- a combining device adapted to combine the second electromagnetic beams of rays into a beam path of the first electromagnetic beam of rays generated by the first radiation source;
- a detection device including a plurality of detectors, each detector adapted to receive the superposed first partial beam of rays and second partial beam of rays superposed by the superposition device, the detection device adapted to form a reference signal generated by superposition of the first electromagnetic beams of rays and the second electromagnetic beams of rays; and
- an evaluation device adapted to form a reference pulse as a function of a position of the reference reflector and the measurement reflector with respect to each other by evaluation of the reference signal;
- wherein the evaluation device is adapted to form a reference pulse at a specifiable position of the reference reflector and the measurement reflector with respect to each other.

16. The position-measurement device according to claim 15, wherein the evaluation device is adapted to form the reference pulse at a position of the reference reflector and the measurement reflector with respect to each other at which a same optical path length is present in the beam paths of the first partial beam of rays and the second partial beam of rays.

17. The position-measurement device according to claim 1, wherein the evaluation device is adapted to evaluate the reference signal created in response to a motion of the measurement reflector with respect to the reference reflector during operation of both the first radiation source and the second radiation source.

18. The position-measurement device according to claim 17, wherein the evaluation device is adapted to evaluate the reference signal created in response to a motion of the measurement reflector with respect to the reference reflector at constant speed during operation of both the first radiation source and the second radiation source.

19. The position-measurement device according to claim 1, wherein the evaluation device is adapted to evaluate a measurement signal created during a motion of the reference reflector and the measurement reflector with respect to each other in exclusive operation of the first radiation source.

20. The position-measurement device according to claim 2, wherein the evaluation device is adapted to evaluate an envelope curve of the reference signal.

21. The position-measurement device according to claim 20, wherein the evaluation device is adapted to evaluate extreme values of the envelope curve.

22. The position-measurement device according to claim 20, wherein the evaluation device is adapted to evaluate maxima and minima of the envelope curve.

23. The position-measurement device according to claim 20, further comprising a filter adapted to separate the envelope curve of the reference signal.

24. The position-measurement device according to claim 23, wherein the filter includes a band pass filter.

25. The position-measurement device according to claim 17, wherein the evaluation device is adapted to ascertain a position signal from the reference signal to form a reference pulse during a relative motion of the reference reflector and the measurement reflector having a specified speed at simultaneous operation of the first radiation source and the second radiation source, a deviation designated as a position deviation of the position signal determined and evaluated by an expected position signal in exclusive operation of the first radiation source.

26. The position-measurement device according to claim 25, wherein the evaluation device is adapted to evaluate a nonlinear portion of the position signal ascertained from the reference signal to form the reference pulse.

27. The position-measurement device according to claim 25, wherein the evaluation device is adapted to evaluate the position signal ascertained from the reference signal by determination and evaluation of a position of at least one of (a) zero crossings and (b) extreme values of the position deviation.

28. The position-measurement device according to claim 20, wherein the evaluation device adapted to evaluate the envelope curve of the reference signal and for a position deviation of the reference signal.

29. The position-measurement device according to claim 1, further comprising an optical delay line arranged in the beam path of at least one of (a) the first partial beam of rays and (b) the second partial beam of rays.

30. The position-measurement device according to claim 1, wherein the combining device is adapted to combine the first electromagnetic beam of rays and the second electromagnetic beam of rays into a light guide.

31. The position-measurement device according to claim 30, further comprising a collimator arranged behind the light guide on an exit side.

32. The position-measurement device according to claim 31, wherein the collimator includes an achromatic collimator.

33. The position-measurement device according to claim 1, further comprising a $\lambda/4$ plate arranged as a delay device between the superposition device and the detection device.

34. The position-measurement device according to claim 33, wherein the $\lambda/4$ plate includes a two-wavelength delay plate.

35. A method for forming a reference pulse in a position-measurement device, comprising:

emitting first electromagnetic beams of rays by a first radiation source;

splitting the first electromagnetic beams of rays in a beam splitter into at least one first partial beam of rays and at least one second partial beam of rays;

reflecting the first partial beam of rays and the second partial beam of rays by a respective one of a reference reflector and a measurement reflector;

superposing the first partial beam of rays and the second partial beam of rays in a superposition device after the reflecting;

emitting second electromagnetic beams of rays by a second radiation source;

combining the second electromagnetic beams of rays into a beam path of the first electromagnetic beams of rays before the beam splitter;

receiving a reference signal by a detection device arranged behind the superposition device generated by superposition of the first electromagnetic beams of rays and the second electromagnetic beams of rays; and evaluating the reference signal by an evaluation device to form a reference pulse in a specified position of the reference reflector and the measurement reflector with respect to each other;

wherein the detection device includes a plurality of detectors, each detector adapted to receive the superposed first partial beam of rays and second partial beam of rays superposed by the superposition device.

36. The method according to claim 35, wherein the first electromagnetic beams of rays and the second electromagnetic beams of rays have different wavelengths.

37. The method according to claim 35, wherein the second electromagnetic beams of rays have a coherence length substantially shorter than a coherence length of the first electromagnetic beams of rays.

38. The method according to claim 35, wherein the second radiation source is operated exclusively during a reference movement of the position-measurement device for generating the reference signal.

39. The method according to claim 35, wherein the evaluation device forms the reference pulse by evaluating the reference signal when a same optical path length is present in beam paths of the first and second partial beams of rays.

40. The method according to claim 35, further comprising moving the measurement reflector at a specified speed with respect to the reference reflector for generating the reference signal.

41. The method according to claim 40, wherein the measurement reflector is moved in the moving step at a constant speed with respect to the reference reflector.

42. The method according to claim 35, further comprising evaluating an envelope curve of the reference signal in the evaluation device.

43. The method according to claim 35, further comprising evaluating an envelope curve of the reference signal in the evaluation device with respect to a position of minima and maxima of the envelope curve.

44. The method according to claim 35, further comprising:
ascertaining a position signal in the evaluation device from the reference signal for the formation of the reference pulse during a relative motion of the reference reflector and the measurement reflector at a specified, known speed; and
determining and evaluation a deviation designated as a position deviation of the position signal by an expected position signal in exclusive operation of the first radiation source.

45. The method according to claim 44, further comprising evaluating a nonlinear component of the position signal by the evaluation device.

46. The method according to claim 44, further comprising evaluating zero crossings of the position deviation by the evaluation device.

47. The method according to claim 35, further comprising evaluating by the evaluation device both an envelope curve of the reference signal and a position deviation of the reference signal for the formation of the reference pulse.

* * * * *

UNITED STATES PATENT AND TRADEMARK OFFICE
CERTIFICATE OF CORRECTION

PATENT NO. : 7,639,366 B2  Page 1 of 1
APPLICATION NO. : 11/431182
DATED : December 29, 2009
INVENTOR(S) : Erwin Spanner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 358 days.

Signed and Sealed this

Ninth Day of November, 2010

David J. Kappos
*Director of the United States Patent and Trademark Office*